United States Patent
Kim et al.

(10) Patent No.: US 9,635,632 B2
(45) Date of Patent: Apr. 25, 2017

(54) METHOD AND APPARATUS FOR DEVICE-TO-DEVICE COMMUNICATION IN WIRELESS COMMUNICATION SYSTEM

(71) Applicant: LG ELECTRONICS INC., Seoul (KR)

(72) Inventors: Suhwook Kim, Seoul (KR); Jinyoung Chun, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 14/766,090

(22) PCT Filed: Feb. 18, 2014

(86) PCT No.: PCT/KR2014/001304
§ 371 (c)(1),
(2) Date: Aug. 5, 2015

(87) PCT Pub. No.: WO2014/126444
PCT Pub. Date: Aug. 21, 2014

(65) Prior Publication Data
US 2015/0373657 A1    Dec. 24, 2015

Related U.S. Application Data

(60) Provisional application No. 61/765,821, filed on Feb. 18, 2013, provisional application No. 61/769,776, filed on Feb. 27, 2013.

(51) Int. Cl.
*H04W 56/00* (2009.01)
*H04W 76/02* (2009.01)

(52) U.S. Cl.
CPC ..... *H04W 56/002* (2013.01); *H04W 56/0015* (2013.01); *H04W 76/023* (2013.01)

(58) Field of Classification Search
CPC .......... H04W 56/0015; H04W 56/002; H04W 76/023
See application file for complete search history.

(56) References Cited

U.S. PATENT DOCUMENTS 5,257,398 A * 10/1993 Schaeffer .............. H04W 16/02
455/447
6,970,495 B1 * 11/2005 Schmidl ................. H04B 1/713
375/130

(Continued)

FOREIGN PATENT DOCUMENTS

KR 10-2012-0003114 A  1/2012
KR 10-2012-0100833 A  9/2012

(Continued)

*Primary Examiner* — Andrew Lai
*Assistant Examiner* — Chuong M Nguyen
(74) *Attorney, Agent, or Firm* — Birch, Stewart, Kolasch & Birch, LLP

(57) ABSTRACT

The present invention relates to a method for device-to-device communication (D2D) in a wireless communication system. Particularly, the method is characterized in that when a device, which has been conducting device-to-device communication, additionally conducts device-to-device communication with a new device, a channel sequence of the device conducting the communication is determined, one of two devices conducting the device-to-device communication is determined as a reference device for channel synchronization and channel synchronization is thereby performed.

14 Claims, 15 Drawing Sheets

(56) References Cited

U.S. PATENT DOCUMENTS

| | | | |
|---|---|---|---|
| 8,811,374 B2* | 8/2014 | Charbit | H04W 56/0045 370/350 |
| 2003/0186683 A1* | 10/2003 | Yamato | H04B 1/713 455/411 |
| 2011/0069957 A1* | 3/2011 | Kim | H04B 3/542 398/75 |
| 2012/0224546 A1 | 9/2012 | Chang et al. | |
| 2012/0294245 A1* | 11/2012 | Chang | H04W 56/002 370/329 |
| 2013/0029675 A1 | 1/2013 | Kwon et al. | |
| 2013/0039324 A1* | 2/2013 | Kwon | H04W 72/04 370/329 |
| 2013/0095845 A1 | 4/2013 | Lim et al. | |
| 2014/0099950 A1* | 4/2014 | Mildh | H04W 56/001 455/434 |
| 2014/0169327 A1 | 6/2014 | Chun et al. | |
| 2014/0337454 A1* | 11/2014 | Yamamoto | H04L 67/34 709/208 |

FOREIGN PATENT DOCUMENTS

| | | |
|---|---|---|
| KR | 10-2012-0129815 A | 11/2012 |
| WO | WO 2011/132818 A1 | 10/2011 |
| WO | WO 2013/015645 A2 | 1/2013 |

\* cited by examiner

FIG. 6
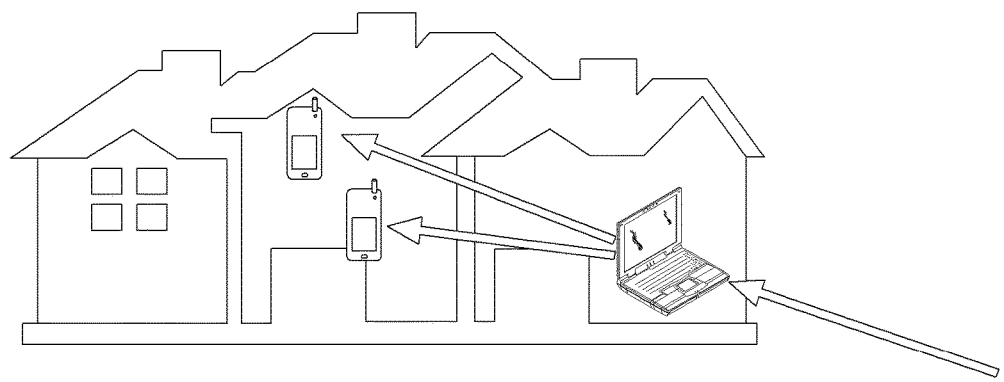
(a)
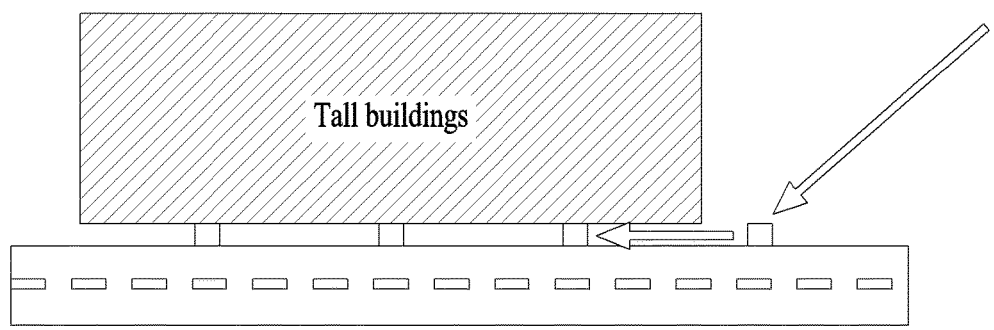
(b)

FIG. 7
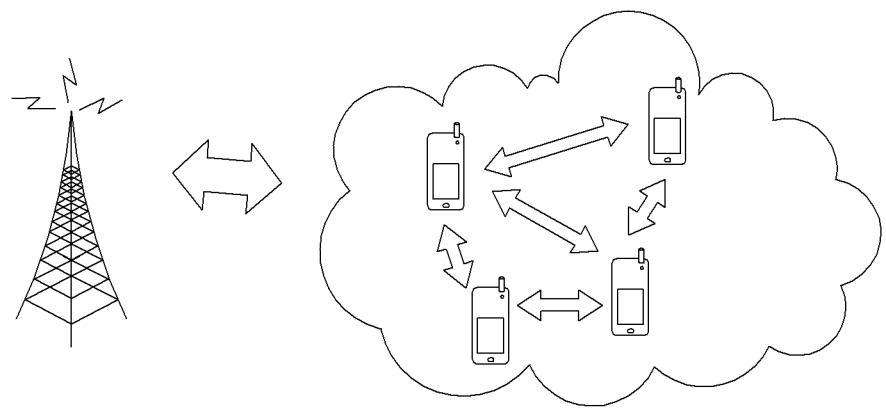
(a)
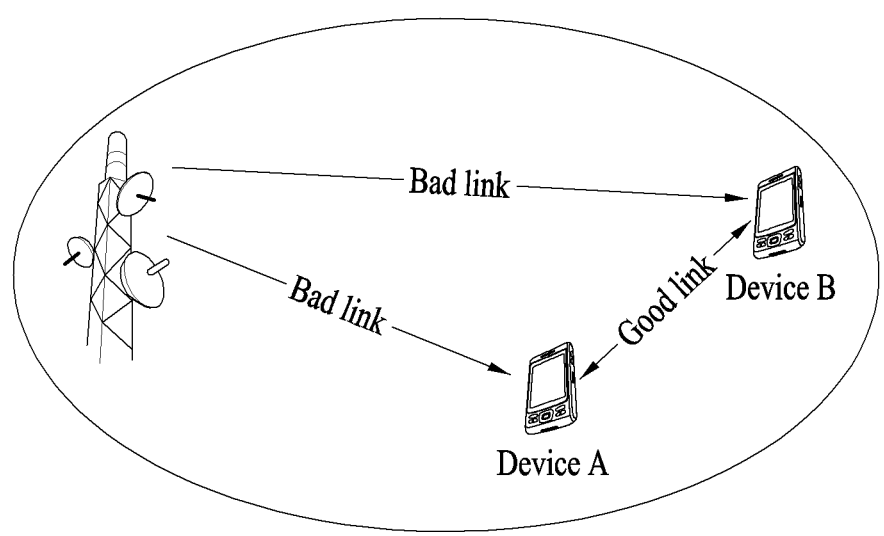
(b)

METHOD AND APPARATUS FOR DEVICE-TO-DEVICE COMMUNICATION IN WIRELESS COMMUNICATION SYSTEM

CROSS REFERENCE TO RELATED APPLICATIONS

This application is the National Phase of PCT International Application No. PCT/KR2014/001304, filed on Feb. 18, 2014, which claims priority under 35 U.S.C. 119(e) to U.S. Provisional Application No. 61/765,821, filed on Feb. 18, 2013 and 61/769,776 filed on Feb. 27, 2013, all of which are hereby expressly incorporated by reference into the present application.

TECHNICAL FIELD

The present invention relates to a wireless communication system, and more particularly, to a method of efficiently performing D2D (device-to-device) communication in a wireless communication system and an apparatus therefor.

BACKGROUND ART

In a cellular communication, a user equipment (UE) accesses a base station to perform communication, receives control information for transceiving data from the base station and transceives data with the base station. In particular, since the UE transmits and receives data through the base station, the UE transmits data of the UE to the base station in order to transmit the data to a different cellular UE. Having received the data, the base station transmits the data to a different UE. As mentioned above, since a UE is able to transmit data to a different UE via a base station only, the base station performs scheduling on a channel and a resource for transceiving the data and transmits scheduling information on the channel and the resource to each UE. As mentioned in the foregoing description, in order to perform D2D (device-to-device) communication via the base station, it is necessary for each UE to have a channel and a resource allocated by the base station to transceive the data. Yet, the D2D communication has a structure that a UE directly transceives a signal with a UE intending to transmit data without passing through a base station or a relay.

In case of performing the D2D communication directly transceiving data between UEs in a manner of sharing a resource with a legacy cellular network, each UE performs the D2D communication after a resource for the D2D communication is allocated. However, a method of transmitting an initial signal for initiating the D2D communication has not been defined yet. And, in case of performing the D2D communication directly transceiving data between UEs in a manner of sharing a resource with a legacy cellular network, synchronization of a UE performing the D2D communication and synchronization of a UE communicating with the cellular network may not be matched with each other. And, synchronization of UEs different from each other and synchronization of UEs performing the D2D communication may not be matched with each other.

DISCLOSURE OF THE INVENTION

Technical Task

A technical task of the present invention is to provide a method of performing D2D (device-to-device) communication in a wireless communication and an apparatus therefor. In particular, the technical task of the present invention is to provide a method of synchronizing a UE that performs channel hopping.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, a method of performing D2D (device-to-device) communication in a wireless communication system, the method comprising: transmitting a sync request message transmitted by a first user equipment (UE) operating with a first channel sequence to a second UE operating with a second channel sequence; receiving a sync response message containing information on the second channel sequence of the second UE from the second UE in response to the sync request message; and determining a third channel sequence determined by the first UE based on information on the first channel sequence and the received information on the second channel sequence, wherein the sync response message comprises channel synchronization reference UE information becoming a reference of channel synchronization between the first UE and the second UE.

To further achieve these and other advantages and in accordance with the purpose of the present invention, transmitting a sync confirm message containing information on the determined third channel sequence transmitted to the second UE by the first UE.

To further achieve these and other advantages and in accordance with the purpose of the present invention, performing channel synchronization performed by the first UE with the second UE based on the channel synchronization reference UE information.

To further achieve these and other advantages and in accordance with the purpose of the present invention, transmitting the information on the determined third channel sequence transmitted by the first UE to at least one or more UEs of which a session is connected with the first UE.

To further achieve these and other advantages and in accordance with the purpose of the present invention, the channel synchronization reference UE corresponds to the second UE receiving the sync request message in D2D communication performed between the first UE and the second UE.

To further achieve these and other advantages and in accordance with the purpose of the present invention, the channel synchronization reference UE corresponds to a receiving side UE receiving data in D2D communication performed between the first UE and the second UE.

To further achieve these and other advantages and in accordance with the purpose of the present invention, the channel synchronization reference UE corresponds to a UE containing an older channel sequence among the first UE and the second UE.

To further achieve these and other advantages and in accordance with the purpose of the present invention, the channel synchronization reference UE is determined by a UE maintaining the greater number of communication session connection among the first UE and the second UE.

To further achieve these and other advantages and in accordance with the purpose of the present invention, the communication session connection corresponds to D2D (device-to-device) communication session connection.

To further achieve these and other advantages and in accordance with the purpose of the present invention, the communication session connection corresponds to session connection communicating with a UE within 2-hops.

To further achieve these and other advantages and in accordance with the purpose of the present invention, the third channel sequence corresponds to a sequence identical to one of the first channel sequence and the second channel sequence.

To further achieve these and other advantages and in accordance with the purpose of the present invention, a method of performing D2D (device-to-device) communication in a wireless communication system, the method comprising: receiving a sync request message received by a second user equipment (UE) operating with a second channel sequence from a first UE operating with a first channel sequence; transmitting a sync response message transmitted by the second UE containing information on the second channel sequence of the second UE to the first UE in response to the sync request message; and determining a third channel sequence determined by the second UE based on information on the received first channel sequence and the information on the second channel sequence, wherein the sync response message comprises channel synchronization reference UE information becoming a reference of channel synchronization between the first UE and the second UE.

To further achieve these and other advantages and in accordance with the purpose of the present invention, a method of performing D2D (device-to-device) communication in a wireless communication system, the method comprising: transmitting information on a first channel sequence transmitted by a first user equipment (UE) operating with the first channel sequence to a second UE operating with a second channel sequence; receiving information on the second channel sequence of the second UE from the second UE in response to the information on the first channel sequence; determining a third channel sequence determined by the first UE based on the information on the first channel sequence and the received information on the second channel sequence; and operating the first UE with the determined third channel sequence, wherein information on the determined third channel sequence comprises hopping sequence information of the first UE for a channel of D2D communication which is performed with a plurality of UEs of which a session is connected with the first UE.

To further achieve these and other advantages and in accordance with the purpose of the present invention, a first user equipment (UE) performing D2D (device-to-device) communication in a wireless communication system, comprising: a transceiver; and a processor, wherein the processor configured to: control the first UE operating with a first channel sequence to transmit a sync request message to a second UE operating with a second channel sequence, receive a sync response message containing information on the second channel sequence of the second UE from the second UE in response to the sync request message, determine a third channel sequence based on information on the first channel sequence and the received information on the second channel sequence, wherein the sync response message comprises channel synchronization reference UE information becoming a reference of channel synchronization between the first UE and the second UE.

Advantageous Effects

According to embodiment of the present invention, it is able to provide a method of efficiently performing D2D (device-to-device) communication in a wireless communication system and an apparatus therefor.

In particular, according to embodiment of the present invention, when a UE performing channel hopping performs D2D communication with a new UE, it is able to provide a method of efficiently performing synchronization and an apparatus therefor.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 6 and 7 are diagrams for an example to which D2D communication is applied;

BEST MODE

Mode for Invention

Figure 1:
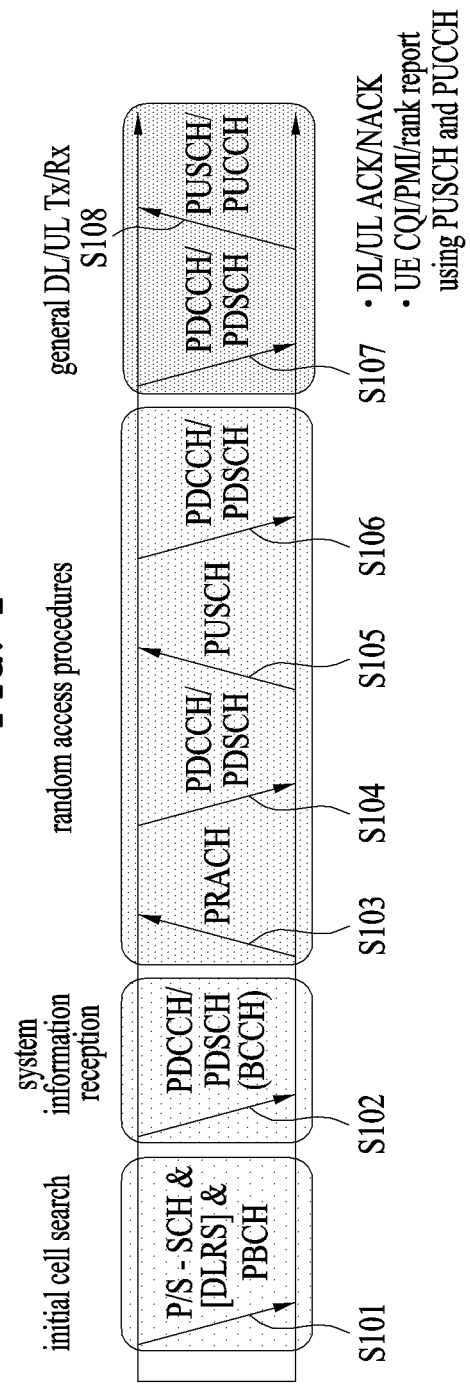
FIG. 1 is a diagram for explaining physical channels used for 3GPP system and a general signal transmission method using the physical channels.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE/LTE-A system, they are applicable to other random mobile communication systems except unique features of 3GPP LTE/LTE-A system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS), and the like. And, assume that a base station is a common name of such a random node of a network stage communicating with a terminal as a Node B, an eNode B, a base station (BS), an access point (AP) and the like.

In a mobile communication system, a user equipment may be able to receive information from a base station in downlink and transmit the information to the base station in uplink. The informations transmitted or received by user equipment may include data and various control informations. And, various kinds of physical channels may exist in accordance with types and usages of the informations transmitted or received by the user equipment.

As an example of a mobile communication system to which the present invention is applicable, 3GPP LTE ($3^{rd}$ generation partnership project long term evolution, hereinafter abbreviated, LTE), LTE-Advanced (hereinafter abbreviated, LTE-A) communication system are schematically described.

Moreover, in the following description, specific terminologies are provided to help the understanding of the present invention. And, the use of the specific terminology can be modified into another form within the scope of the technical idea of the present invention.

Embodiments of the present invention can be supported by the standard documents disclosed in at least one of IEEE 802 system, a 3GPP system, 3GPP LTE/LTE-A (LTE-Advanced), and a 3GPP2 system, which correspond to wireless access systems. In particular, steps or parts among the embodiments of the present invention, which are not explained to clearly disclose the technical idea of the present invention, can be supported by the documents. And, all terminologies disclosed in the present specification can be explained by the standard document.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

For clarity, the present invention is described in a manner of mainly concerning 3GPP LTE/LTE-A, by which the technical characteristics of the present invention may be non-limited.

3GPP LTE/LTE-A System to which the Present Invention is Applicable

FIG. 1 is a diagram showing physical channels used in a 3GPP system and a general signal transmission method using the same.

A UE performs an initial cell search procedure such as establishment of synchronization with a BS when power is turned on or the UE enters a new cell (step S101). The UE may receive a Primary Synchronization Channel (P-SCH) and a Secondary Synchronization Channel (S-SCH) from the BS to establish synchronization with the BS and acquire information such as a cell identity (ID).

Thereafter, the UE may receive a physical broadcast channel from the BS to acquire broadcast information within the cell. Meanwhile, the UE may receive a Downlink Reference Signal (DL RS) in the initial cell search step to confirm a DL channel state.

Upon completion of the initial cell search procedure, the UE may receive a Physical Downlink Control Channel (PDCCH) and a Physical Downlink Shared Channel (PDSCH) according to information included in the PDCCH to acquire more detailed system information (step S102).

Meanwhile, if the UE initially accesses the BS or if radio resources for signal transmission are not present, the UE may perform a random access procedure (steps S103 to S106) with respect to the BS. To this end, the UE may transmit a specific sequence through a Physical Random Access Channel (PRACH) as a preamble (steps S103 and S105), and receive a response message to the preamble through the PDCCH and the PDSCH corresponding thereto (steps S104 and S106). In the case of a contention-based RACH, a contention resolution procedure may be additionally performed.

After the above random access procedure, the UE may receive a PDCCH/PDSCH (S107) and transmit a Physical Uplink Shared CHannel (PUSCH)/Physical Uplink Control CHannel (PUCCH) (S108) in a general uplink/downlink signal transmission procedure.

Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), a Channel Quality Indicator (CQI), a Precoding Matrix Indicator (PMI), a Rank Indicator (RI), etc.

In LTE system, the UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Frame structure is described with reference to FIG. 2 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

Figure 2:
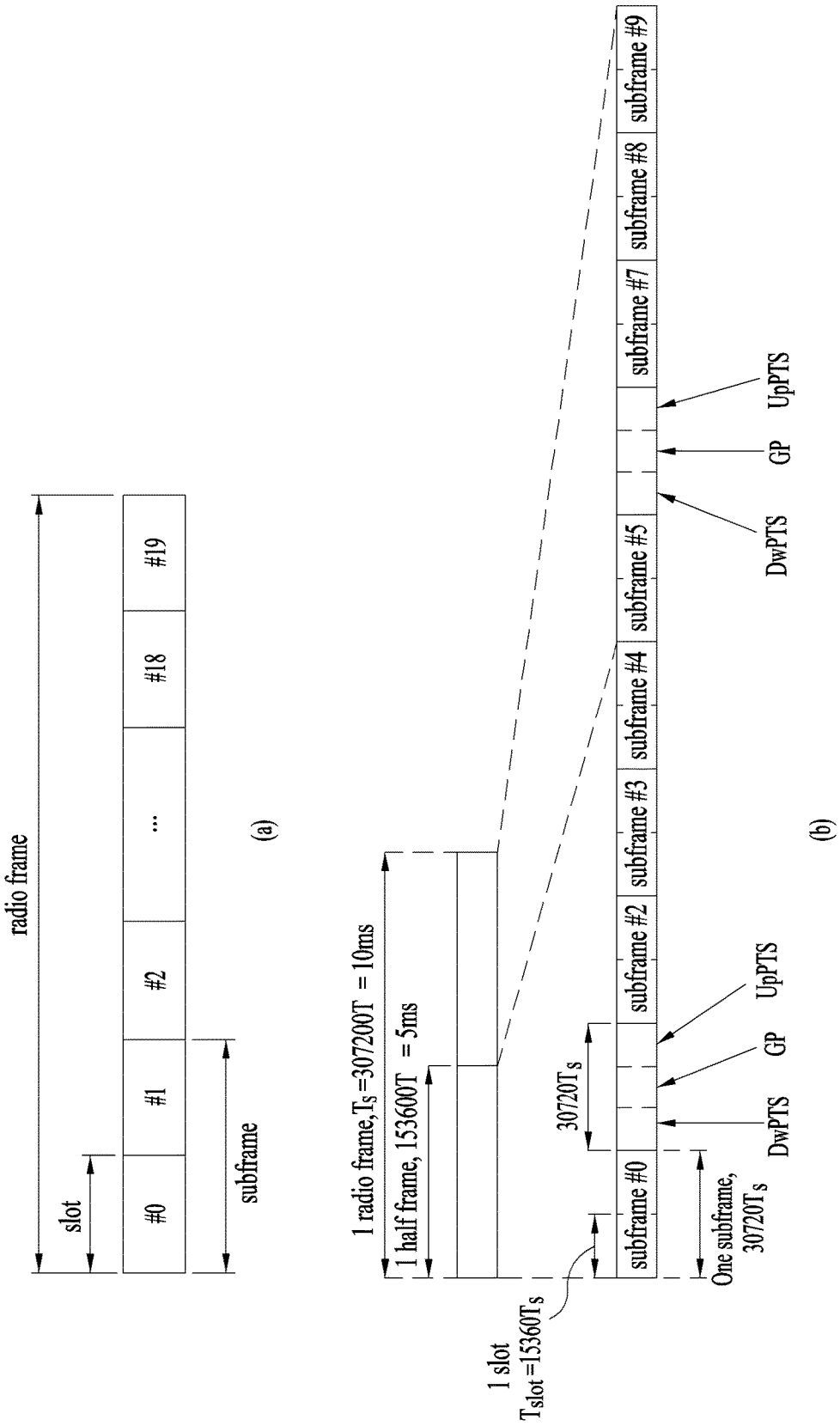
FIG. 2 is a diagram for a structure of a radio frame in 3GPP LTE system.

FIG. 2 (*a*) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2 (*b*) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, one subframe includes 2 slots irrespective of the type of the radio frame.

The above-described structures of the radio frame are just exemplary. And, the number of subframes included in a radio frame, the number of slots included in the subframe and the number of symbols included in the slot may be modified in various ways.

Figure 3:
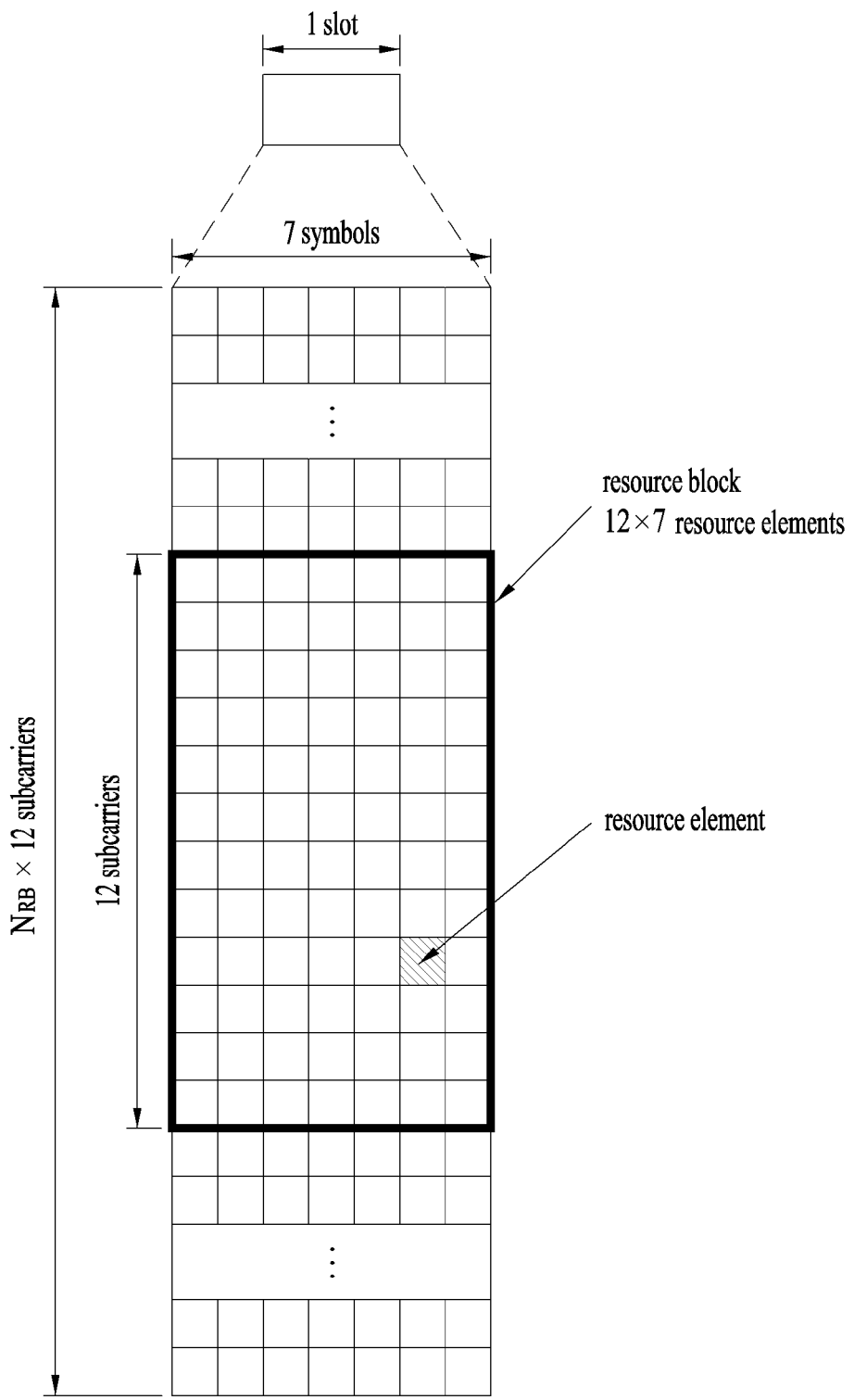
FIG. 3 is a diagram for an example of a resource grid for a downlink slot.

FIG. 3 is a diagram for one example of a resource grid for a downlink (DL) slot.

Referring to FIG. 3, one downlink (DL) slot may include 7 OFDM symbols and one resource block (RB) may include 12 subcarriers, by which the present invention may be non-limited. For instance, in case of a normal cyclic prefix (CP), one slot includes 7 OFDM symbols.

Yet, in case of an extended CP, one slot may include 6 OFDM symbols. Each element on a resource grid may be named a resource element (hereinafter abbreviated RE). one resource block includes 12 7 resource elements. The number NDL of resource blocks included in a DL slot may depend on a DL transmission bandwidth. And, the structure of an uplink (UL) slot may be identical to that of the DL slot.

Figure 4:
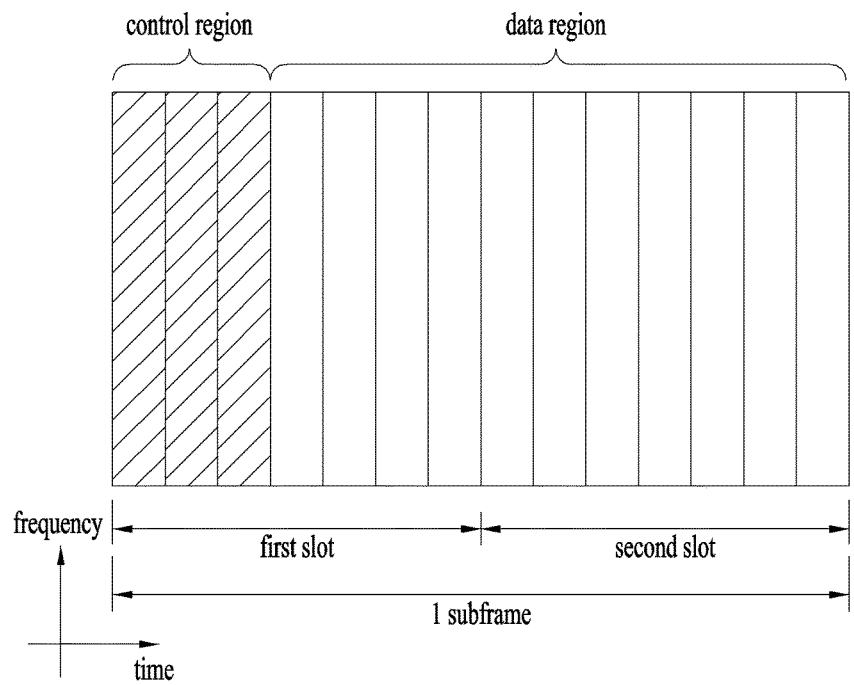
FIG. 4 is a diagram for a structure of a downlink subframe.

FIG. 4 is a diagram for a structure of a downlink (DL) subframe.

Referring to FIG. 4, Maximum 3 OFDM symbols situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group.

Figure 5:
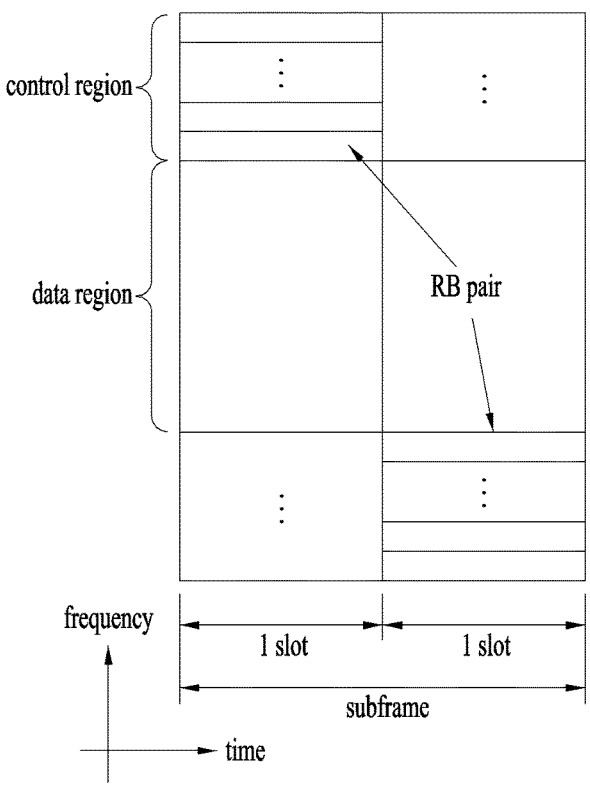
FIG. 5 is a diagram for a structure of an uplink subframe.

FIG. 5 is a diagram for a structure of an uplink subframe.

Referring to FIG. 5, a UL subframe may be divided into a control region and a data region in frequency domain. A physical UL control channel (PUCCH), which carries UL control information, is assigned to the control region. And, a physical UL shared channel (PUSCH), which carries user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

General of Device-to-Device (D2D) Communication

In short range communication, D2D communication is generally defined in a peer-to-peer form. Main entities of the communication perform communication with each other in a manner of defining and regulating a random access scheme between the communication entities. It is not necessary to consider whether one of the communication entities is actually connected to a public Internet network.

On the contrary, communication in cellular network is defined by communication performed between a base station and a UE or communication performed between an existence equivalent to the base station and a UE and all communication activities are controlled by the base station or the existence equivalent to the base station. In this regulation, the cellular network has a structure capable of obtaining maximum throughput in a manner of putting a limit on operations of all UEs according to a prescribed rule. On the other hand, due to the prescribed rule, there may exist an over-ruled aspect depending on an application or a channel environment of s UE. For instance, if a base stations determines power to be consumed by a UE for transmitting same data traffic and controls all behaviors of the UE for transmitting same data traffic, short range communication should be performed in a form that the base station is positioned between UEs. In order to perform the short range communication while low power is consumed, a UE should have a structure utilizing a further different RAT (radio access technology) or accept inconvenience of the cellular network as it is. This structural problem may correspond to a form of putting a limit on accessing a new access path and using an optimal communication path when a UE accesses a network due to poor channel environment.

FIGS. 6 and 7 are diagrams for an example to which D2D communication is applied.

If a propagation loss between a source UE and a base station is big or channel quality is lower than a prescribed level, D2D communication can be triggered. For instance, as shown in FIG. 6 (a), if a plurality of UEs are positioned at the indoor, a channel status may vary according to a UE position. Hence, the source UE may enhance data throughput or increase data reception quality in a manner of performing D2D communication. And, as shown in FIG. 6 (b), although a source UE is positioned at an alley between high rise buildings and belongs to a radio shadow area, if a channel status of the source UE with a different neighboring UE is good, power efficiency of a UE, which becomes a source of data traffic, and throughput can be enhanced in a manner that the source UE is communicating with the neighboring UE and the neighboring UE of good channel status is communicating with a base station. As mentioned in the foregoing description, when there exist a plurality of UEs and a plurality of the UEs are managed, it may be able to consider a model that a specific UE plays a role of an aggregator aggregating a plurality of the UEs with each other in a form that a server accesses each of a plurality of the UEs via a base station.

As a different example, as shown in FIG. 7, if a UE intends to communicate with a neighboring UE by utilizing a RAT of a cellular only without using a different RAT, a base station controls corresponding data to be transceived between the UE and the cellular. Yet, although UEs are physically very close to each other, data transceived between the UEs should be delivered to the base station and then the data is retransmitted to a target UE. It might be very irrational communication structure. In this case, if an owner, which manages the UEs directly performing D2D communication, manages the UEs in the vicinity of the UEs, it is preferable to directly deliver data to a management UE of the owner instead of delivering the data to the base station.

In this case, if it is compared with a case of using a different RAT (e.g., Wi-Fi, Bluetooth, Zigbee, etc.), since it is not necessary for a UE to include a modem for multiple RATs, it is able to configure an inexpensive eco-system. And, if the multiple RATs are not used, it is not necessary to implement a processing configuration for an unnecessary application layer. Moreover, if a wireless interface (air-interface) is integrally designed for communication between UEs and communication between a UE and a base station based on a single RAT, it may be able to overcome inefficiency of the wireless interface, which may occur when the wireless interface is independently designed based on multiple RATs. In particular, if short range communication and cellular network access are permitted by utilizing a single RAT, it may be able to configure a very efficient eco-system for D2D devices. The aforementioned characteristic can also be identically applied to a human device. In this case, both short range and long range communication can be performed via a device of low power and low complexity and it is able to perform active QoS (quality of service) management for efficiently performing power consumption level or throughput management.

In the following, direct D2D communication in the present invention indicates a method of directly performing communication between UEs without passing through a base station in a situation that a channel state is good between two or more UEs or UEs are adjacent to each other. In this case, although each UE exchanges data with each other via direct communication, D2D communication related to the present invention is different from Bluetooth (BT) communication, infrared communication and the like configured to exchange data between UEs without involvement of a base station in that prescribed control information for the D2D communication is provided by a base station.

Such a terminology as direct D2D communication can be used in a manner of being mixed with such a terminology as D2D communication (M2M (MS-to-MS) communication), P2P (peer-to-peer) communication, and the like.

Method of Performing D2D Communication

Initial transmission, which is performed after a resource for D2D communication is allocated to a D2D UE, is different from initial transmission of a cellular network in that each D2D UE clearly knows the resource for the D2D communication.

And, in case of performing the D2D communication in a manner of sharing a resource with a legacy cellular network, synchronization (e.g., subframe time synchronization) between a UE communicating with the cellular network and a D2D UE performing the D2D communication or synchronization between D2D UEs different from each other and the D2D UE performing the D2D communication may not be matched with each other. In case of a UE using the cellular network, the UE transmits a signal in a manner of matching synchronization with a base station. Yet, delays due to a path are different from delays of the D2D UE performing the D2D communication. Hence, the D2D UE performing the D2D communication receives inter-carrier interference due to the mismatch of the synchronization. Hence, it is necessary to have a method of preventing performance degradation, which is occurred due to the inter-carrier interference.

In case of performing D2D communication, although a D2D UE is able to match coarse synchronization with each other using a base station of a cellular network, since a path is different from a path of the cellular network, fine synchronization between D2D UEs performing direct communication is different from synchronization of a base station in the cellular network or synchronization between D2D UEs performing the D2D communication with D2D UEs different from each other. And, in case of performing the D2D communication, it may be difficult to transmit data with a downlink channel structure due to a hardware (H/W) limitation of a D2D UE. Hence, it may be preferable to transmit data using an uplink channel structure. In this case, it is necessary to have a reference signal (or a synchronization signal) to match the fine synchronization with each other for the D2D communication between the D2D UEs performing the D2D communication. In particular, unlike the cellular network, since precisely matching synchronization in direct communication, which includes a limitation on transmit power for both a transmission D2D UE and a reception D2D UE to minimize interference with other UEs, is closely related to data transmission capability, configuration of a reference signal for synchronization is very important.

Channel Hopping

Figure 8:
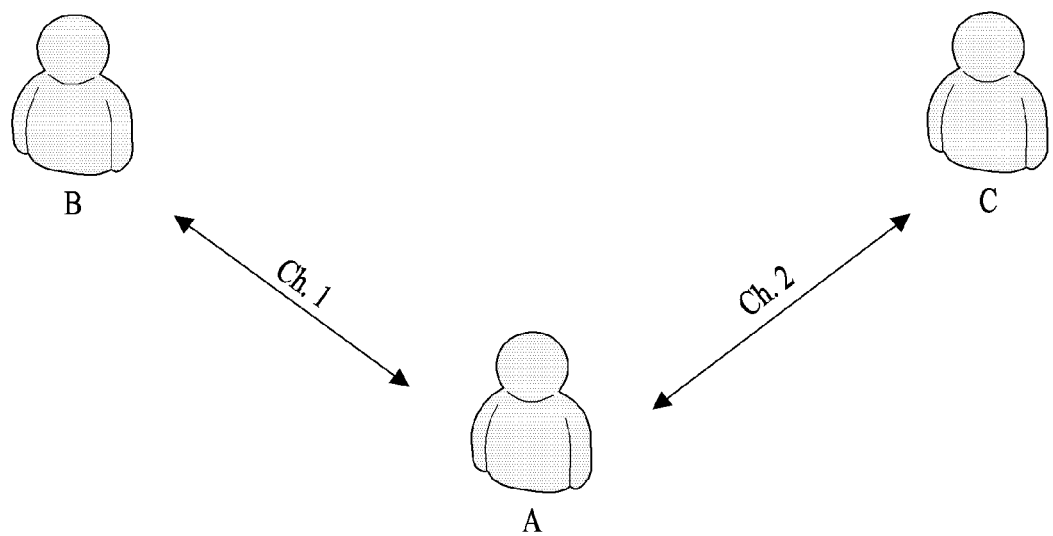
FIG. 8 is a diagram for an example of channel hopping performed by a UE.

FIG. 8 is a diagram for an example of channel hopping performed by a UE.

As shown in FIG. 8, a user A establishes a session with a user B and a user C, respectively, and is communicating with the user B and the user C at the same time. A UE of the user A and a UE of the user B are communicating with each other using a channel 1 and the UE of the user A and a UE of the user C are communicating with each other using a channel 2. Assume IEEE 802.11 system in the present invention. In particular, assume CSMA-CA (carrier sense multiple access-collision avoidance) among the IEEE 802.11 system in the present invention. The CSMA-CA system of IEEE 802.11 regulates a user to sense a fixed channel all the time. In other word, if the user A is transceiving data communication with the user B on the channel 1, the user A is unable to transceive data communication with the user C.

If it is unable to transceive data with two UEs at the same time, it may be able to consider two methods as a method capable of solving the aforementioned problem. One method is to configure channels of two sessions (e.g., A-B and A-C) to be identical to each other. It may be able to ask the user C to change a communication channel to the channel 1. Similarly, it may be able to ask the user B to change a communication channel to the channel 2. The user A can also ask both the user B and the user C to change a communication channel to a different channel, i.e., a channel 3.

Yet, in case of communicating with a plurality of users on a single channel, although the user A is able to sense a single channel only, it may not be able to consider a communication channel of the user B and a communication channel of the user C. The user C may be laid on communication environment of which the user C is unable to use the channel 1. Or, when there exist a plurality users connected with the user A including B, C, D, E, F, . . . etc., if channels used by a plurality of the users are unified into a single channel, resources are inefficiently used and performance can be degraded.

Another method is to perform communication, which is performed by the user A, using the channel 1 and the channel 2 in turn. As mentioned in the foregoing description, when a user operates on a channel, the user is unable to receive data coming from a different channel and is unable to transmit data. Similar to the user A, since the user B and the user C are able to communicate with a plurality of users in a manner of establishing a session, the user B and the user C are also able to perform communication alternately using a plurality of channels (or in a prescribed order). When each user performs communication alternately using channels of each user, if information is not sufficient between users, the users may operate on a same channel on specific time and the users may not be able to normally perform communication due to a communication interruption variable. Hence, in order for a user to operate while changing channels, it is necessary to define a prescribed rule or standard for the channel change.

Figure 9:
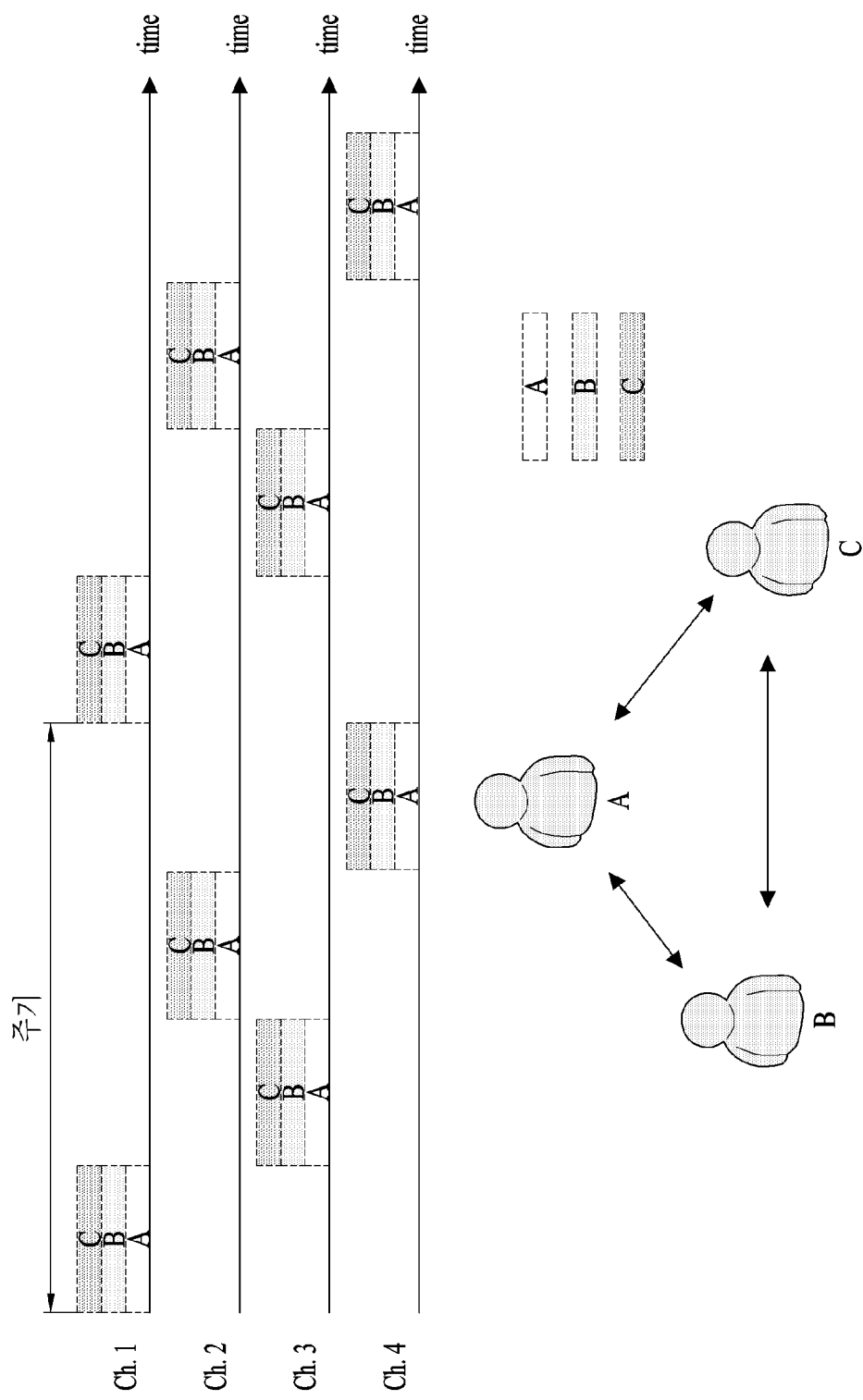
FIG. 9 is a diagram for an example of channel hopping in D2D communication environment.

FIG. 9 is a diagram for an example of channel hopping in D2D communication environment.

As shown in FIG. 9, assume that there exist 3 users (terminals) including A, B and C and assume that there exist 4 channels including a channel 1, 2, 3 and 4. In drawing, it is able to check that the 3 users are all hopping with a same sequence (ch.1→ch.3→ch.2→ch.4). Since the channel sequence is repeated and the user A, B and C are hopping on a same channel at the same time, it satisfies a condition of sensing a single channel assumed by IEEE. 802.11 CSMA-CA system. Hence, the user A, B and C can transceive data with a preferred user. A user terminal, which has initiated an operation, makes a channel sequence (hopping sequence) of the user terminal according to channel environment of the user terminal and provides information on the channel sequence to different user terminals. The different users make hopping sequence of its own with reference to the information and may be then able to establish a session with a preferred user. Subsequently, if the session is established and sequence information is exchanged with each other, it is able to know time and a channel on which each user terminal is operating.

Embodiment

Figure 10:
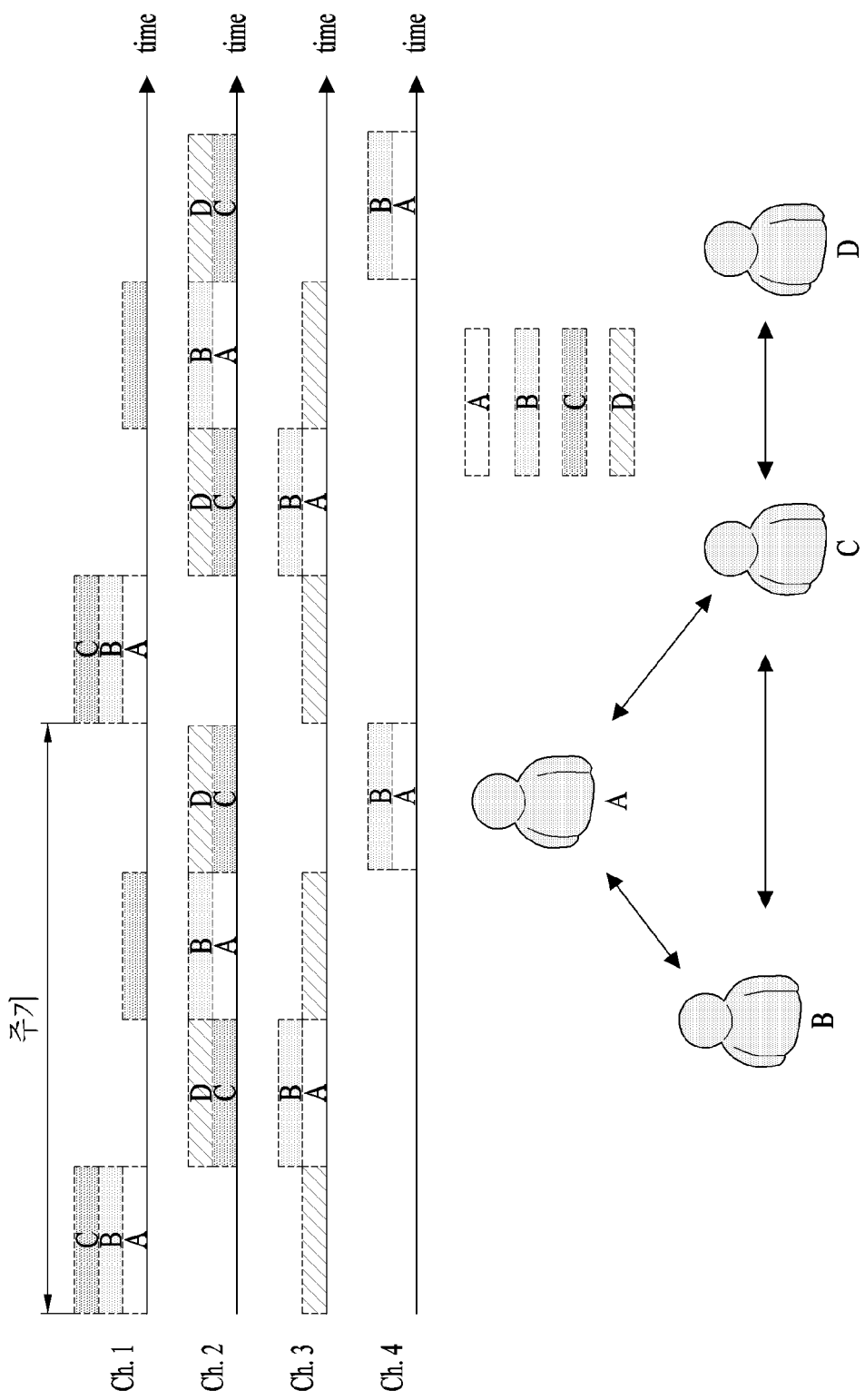
FIG. 10 is a diagram for D2D communication according to one embodiment of the present invention.

FIG. 10 is a diagram for D2D communication according to one embodiment of the present invention.

The present invention proposes a method of configuring a channel sequence among a method for a first UE operating with a first channel sequence to establish a new session with a second UE operating with a second sequence as a D2D communication method.

First of all, the first UE receives a D2D communication request message from the second UE. If the first UE wants to perform communication with the second UE, the first UE can transmit a request acceptance message to the second UE. If the first UE does not accept the communication request of the second UE, D2D communication can be postponed until a request message is received again.

The first UE can transmit the first sequence corresponding to a channel sequence of the first UE to the second UE. Subsequently, the first UE receives second channel sequence information from the second UE and may be then able to determine third channel sequence based on the first channel sequence information and the second channel sequence information. In this case, the third channel sequence information can include channel information on communication with a terminal of which a session is connected with the first UE and time section information of communication with a terminal of which a session is connected with the first UE. In other word, the third channel sequence information can include information on an operation interval of the first UE and information on channel hopping made by the first UE within an interval.

As shown in FIG. 10, assume that the UE A, B and C are hopping with a same channel sequence (ch.1→ch.3→ch.2→ch.4) mentioned earlier in FIG. 9. Hence, the UE A, B and C can perform communication with each other and can transceive data between the UE A and the UE B, between the UE A and the UE C and between the UE B and the UE C on a same channel and at the same time section. Yet, it is necessary to be cautious that CSMA-CA system sets a limit for a UE to transceive data with two or more UEs at the same time.

Referring to FIG. 10, the UE A, B and C are hopping with a prescribed channel sequence. In this case, if a new UE D intends to perform D2D communication with the UE C, a problem may occur. First of all, in terms of the UE C, the UE C performs communication in a manner of repeating the prescribed channel sequence (ch.1→ch.3→ch.2→ch.4) as a period. In this case, if the UE C receives a D2D communication request from the UE D, in order to communicate with the UE D, the UE C may request a configuration change of a channel sequence capable of communicating with the UE A, B and D. In FIG. 10, one period can be divided into 4 time sections. Communication is performed on the first channel in a first time section, communication is performed on the third channel in a second time section, communication is performed on the second channel in a third time section and communication is performed on the fourth channel in a fourth time section. In this case, in order for the UE C to add D2D communication with the UE D, the UE C should know channel sequence information of the UE D. The UE D can transmit a message for requesting D2D communication to the UE C. If the UE C accepts the communication request of the UE D, the UE C can transmit a message including channel sequence information of the UE C to the UE D. The message including the channel sequence of the UE C is transmitted to the UE D to enable current channel sequence information of the UE C to be exchanged with the UE D. By doing so, the UE D may refer to the channel sequence information of the UE C when the UE D configures a new channel sequence. The UE D receives the channel sequence information of the UE C from the UE C and may be able to transmit a channel sequence of the UE D to the UE C. In this case, it is able to know that the channel sequence of the UE D operates on the channel 3 in the first time section, operates on the channel 2 in the second time section, operates on the channel 3 in the third time section and operates on the channel 2 in the fourth time section. This period corresponds to a half period of the period of the UE C. It is able to know that the sequence of the UE D operates on the channel 2 and the channel 3 in turn (ch.2→ch.3→ch.2→ch.3). Hence, the UE C knows that the UE C is unable to communicate with the UE D with a legacy channel sequence and may be able to determine a new channel sequence. In this case, as an example, the UE C can configure the UE C to communicate with the UE D in the second time section and the fourth time section in a manner of matching the second time section and the fourth time with the UE D. By doing so, the UE C can communicate with the UE A and the UE B in a partial time section to communicate with the UE D. The UE C can communicate with the UE A and the UE B in the first time section, communicate with the UE D in the second time section, communicate with no UE in the third time section (yet, the UE A and the UE B are communicating with each other in the third section) and communicate with the UE D in the fourth time section in a manner of determining a channel sequence (ch.1→ch.2→ch.1→ch.2). In this case, the UE C empties out the third time section among the total one period for an example. The UE C can configure the UE C to perform communication with one of the UEA, B and D in the third time section. Hence, performance degradation problem does not occur. And, since a partial time section can be actively reserved for a D2D communication channel with a different UE, utilization of the partial time section can be variously configured.

The basic assumption of FIG. 10 can also be differently configured. First of all, assume that the UE C is communicating with the UE D. And, it may be able to assume a case that the UE C intends to perform new D2D communication with the UE A and the UE B. For example, when the UE C is transceiving data with the UE D, the UE C intends to play a game supporting 3-way D2D with the UE A and the UE B. This case can also be explained in a manner of being similar to what is mentioned earlier. First of all, the UE C can communicated with the UE D in an order of ch.3→ch.2→ch.3→ch.2. In this case, the UE C can transmit a message for requesting a new D2D communication to the UE A and the UE B. The UE A and the UE B can determine whether to accept the request. If multi-UE D2D communication between the UE A, the UE B and the UE C is permitted, the UE C can transmit channel sequence information of the UE C to the UE A and the UE B. The channel sequence information can include information on a time section and a channel of which the UE C has performed communication with the UE D prior to the new communication. The UE A and the UE B can determine and change a channel sequence to be operated in the new communication based on the channel sequence information of the UE C. The UE A and the UE B can transmit the changed channel sequence to the UE C. Having received the changed channel sequence, the UE C may be able to change a channel sequence of the UE C in a manner of reflecting the changed channel sequence to the channel sequence of the UE C. If the channel sequence of the UE C is changed by the UE A and the UE B, the UE C can transmit the changed channel sequence of the UE C to the UE D maintaining legacy communication and may be able to communicated with the UE D based on the changed channel sequence information.

Figure 11:
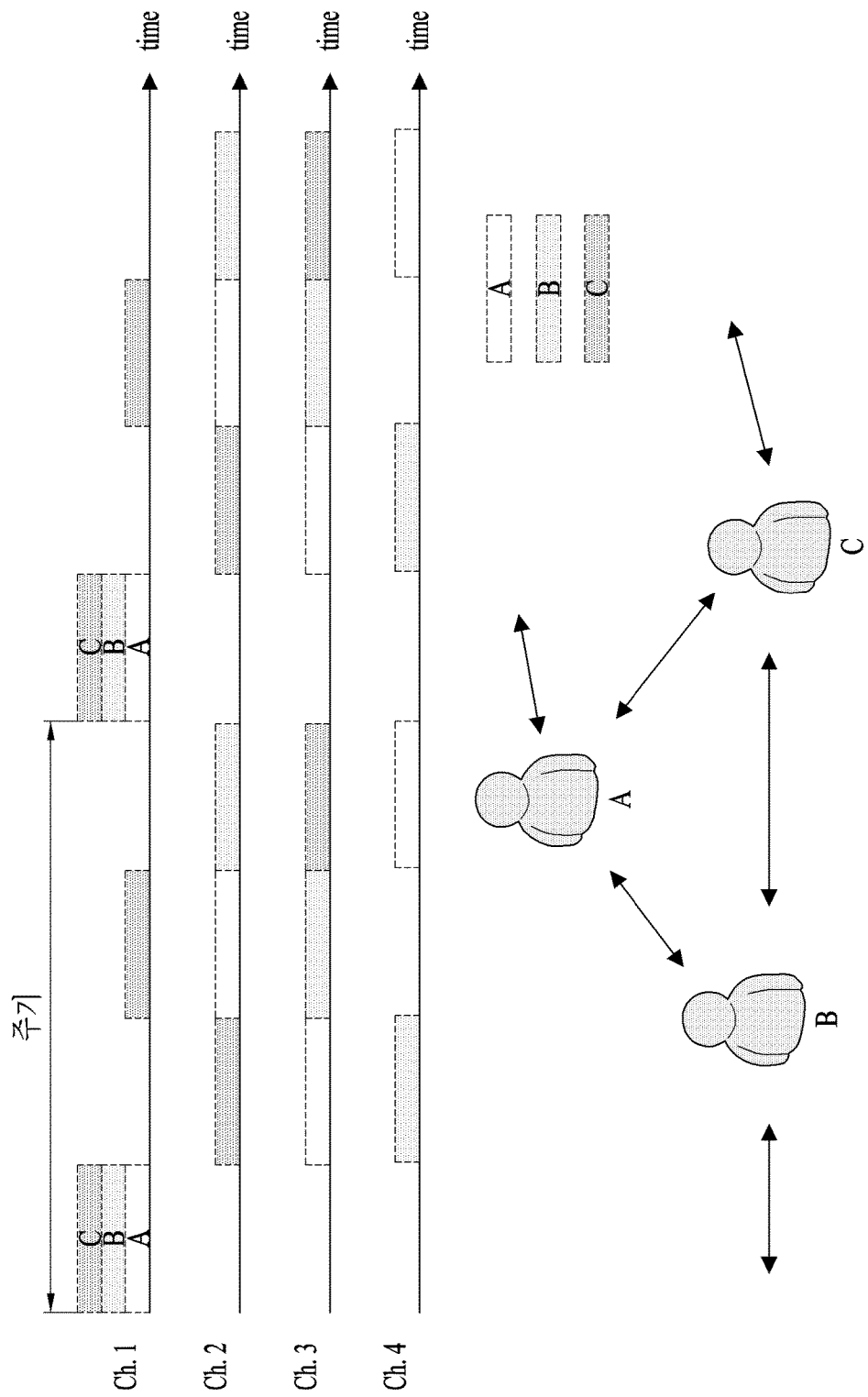
FIGS. 11 and 12 are diagrams for a different example of D2D communication according to the present invention.

FIG. 11 is a diagram for a different example of D2D communication according to the present invention.

As shown in FIG. 11, assume a situation that the UE A, B and C perform D2D communication using ch.1 in a first time section of a prescribed period. Similarly, as shown in FIG. 9, assume a situation that the three UEs are operating with such a channel sequence as ch.1→ch.3→ch.2→ch.4. In this case, the UE A intends to establish a session with a new UE and the UE B and the UE C also intend to establish a session with a new UE, respectively. A channel sequence of a UE intending to connect with each UE is different from each other (of course, it may be identical to each other). As mentioned in the foregoing description, each of the three UEs can determine a new channel sequence in a manner of exchanging channel sequence information of a UE with channel sequence information of a new UE with each other and may be able to operate with the determined channel sequence. FIG. 11 shows an example that all of the three UEs operate with the determined channel sequence. A channel sequence of each of the three UEs within a period is explained. First of all, the UE A has a channel sequence of ch.1→ch.3→ch.2→ch.4 (the channel sequence of the UE A is not changed), the UE B has a changed channel sequence of ch.1→ch.4→ch.3→ch.2 and the UE C has a changed channel sequence of ch.1→ch.2→ch.1→ch.3.

Figure 12:
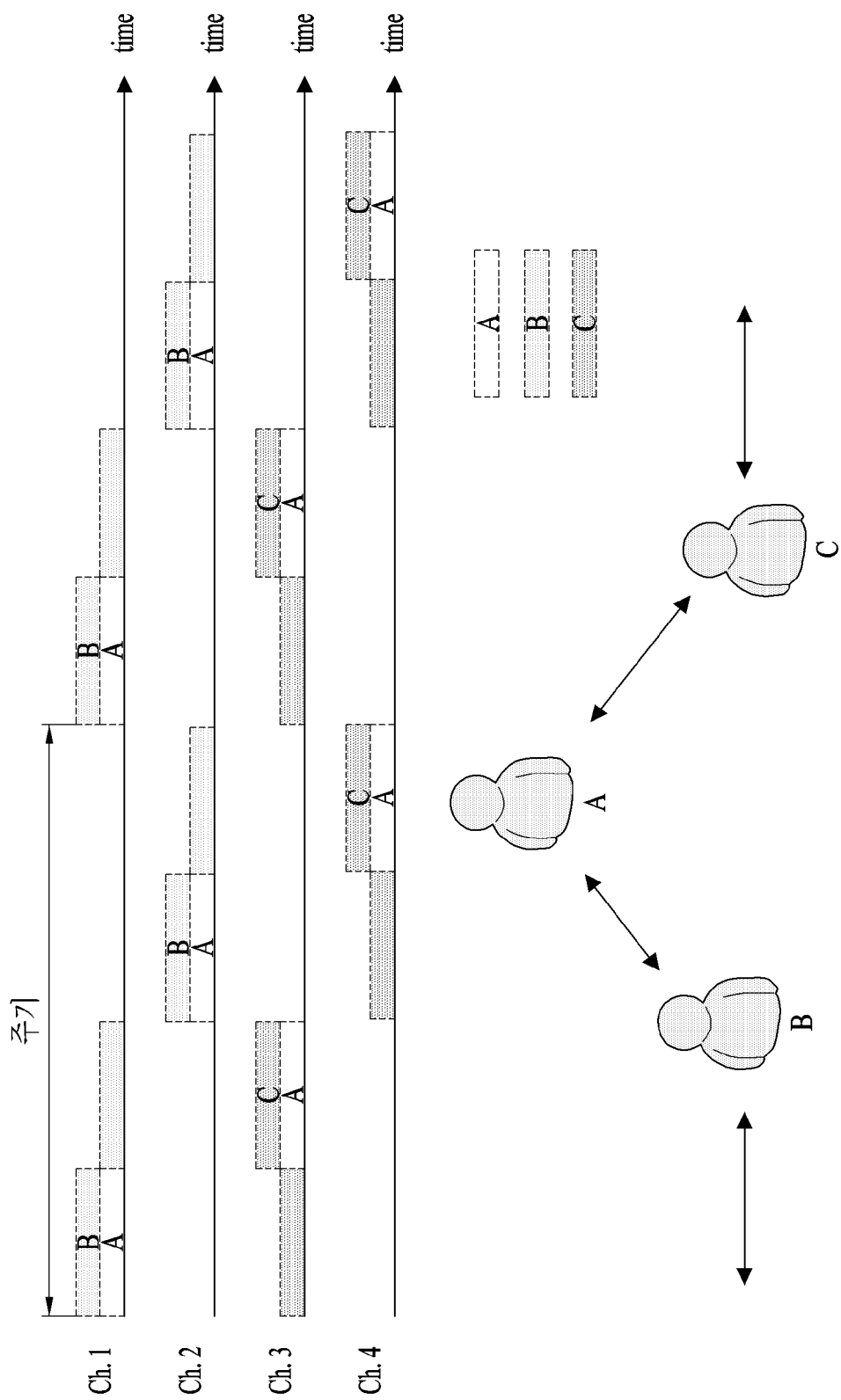

FIG. 12 is a diagram for a different example of D2D communication according to the present invention.

As shown in FIG. 12, assume a situation that the UE A, B and C perform D2D communication with a prescribed period. There is a difference between FIG. 11 and FIG. 12. In FIG. 11, the UE A, B and C perform multi-UE D2D communication, whereas the UE A establishes a single D2D communication session with the UE B and the UE A establishes a different single D2D communication session with the UE C in FIG. 12. When a single UE performs a plurality of D2D communication, the UE can determine a channel sequence using the aforementioned scheme to add D2D communication with a new UE. The UE A performs communication with the UE B using the ch.1 in a first time section of a period and performs communication with the UE B using the ch.2 in a third time section. The UE A performs communication with the UE C using the ch.3 in a second time section of the period and performs communication with the UE C using the ch.4 in a fourth time section. In this case, the UE B and the UE C can add D2D communication with a new UE, respectively, besides the D2D communication with the UE A. As mentioned in the foregoing description, the UE B and the UE C can change a channel sequence in a manner of exchanging legacy channel sequence information of the UE B and the UE C with a new UE. If the channel sequence is changed, the UE B and the UE C transmit the changed channel sequence to the UE A corresponding to a counterpart UE of the legacy D2D communication and may be then able to maintain the communication with the UE A.

Synchronization of D2D Communication

Figure 13:
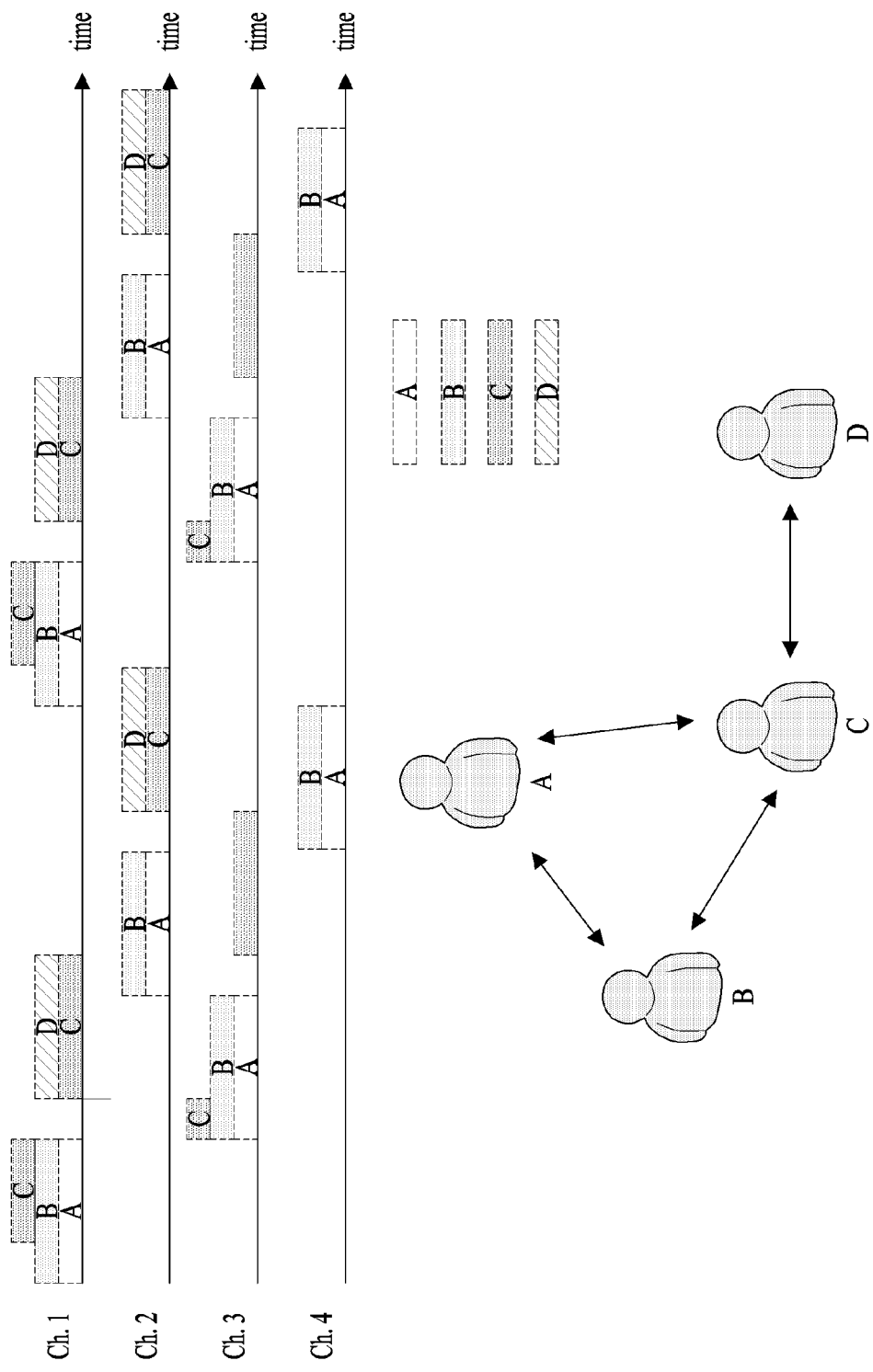
FIGS. 13 and 14 are diagrams for a further different example of D2D communication according to the present invention.
Figure 14:
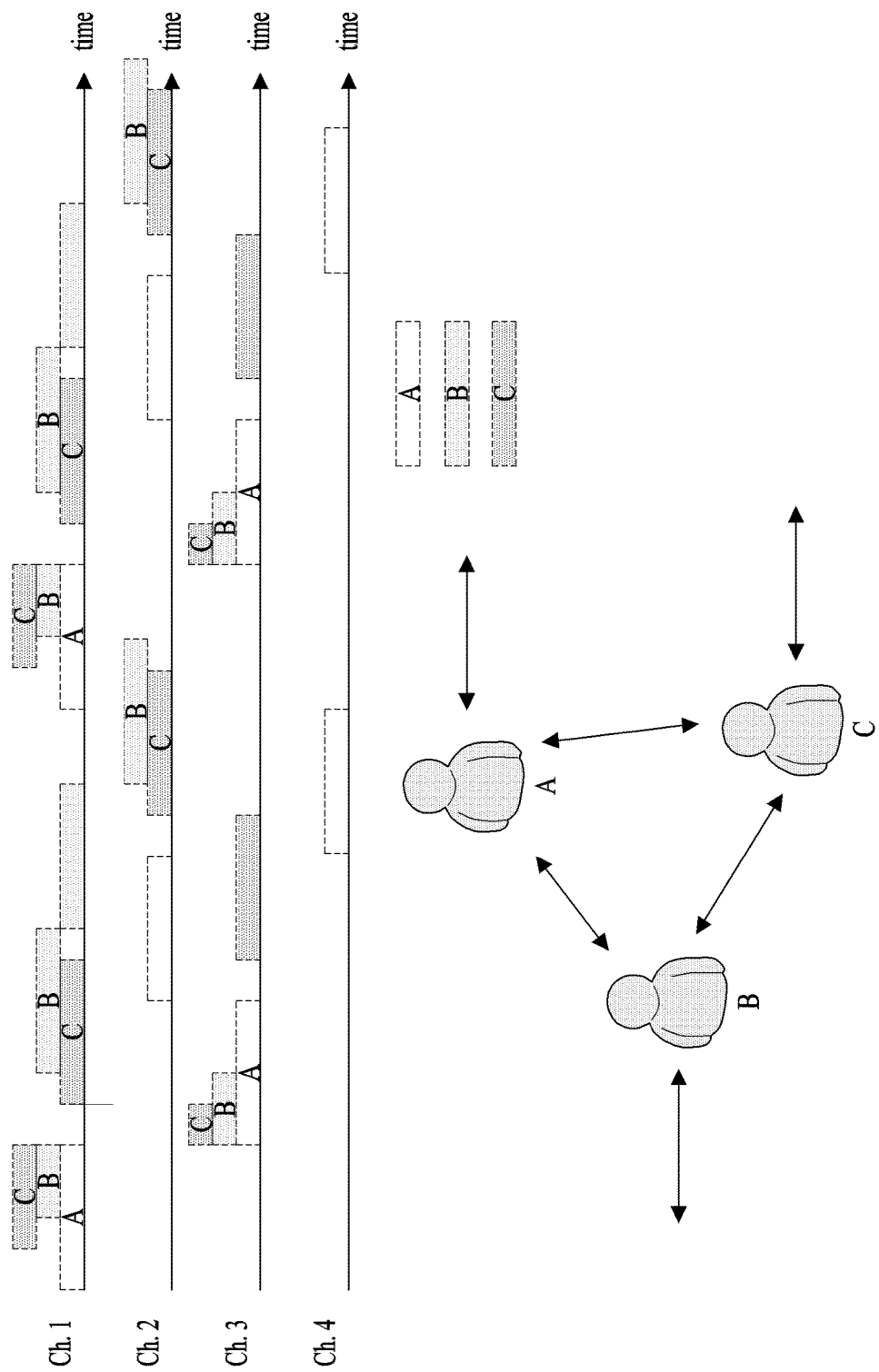

FIGS. 13 and 14 are diagrams for a further different example of D2D communication according to the present invention.

FIG. 13 shows a case that channel sequences of UEs are not synchronized. The situation assumed in FIG. 10 has placed emphasis on a channel sequence and has not considered channel synchronization. Each UE can respectively perform D2D communication and may have channel synchronization different from each other. Hence, when the UE A, B and C are communicating with each other, if a new UE D intends to establish a session with the UE C, the UE C should determine whether to match synchronization with a legacy communication channel (in this case, channel synchronization between the UE A and the UE B is matched with each other) or a channel of the newly added counterpart UE. Or, the UE C should determine whether to configure a new synchronization.

In terms of the UE C intending to add new communication, if the UE C does not perform synchronization with a legacy communication session and synchronization with a new communication session, it may hinder efficient communication and it is highly probable to cause resource waste. In the drawing, on the basis of the UE C, the UE C communicates with the UE A and the UE B on ch.1 in a first time section. If the UE C hops to ch.3, since a time section of the UE C, which is very short compared to time section of the UE A and time section of the UE B, is allocated as time for communicating with the UE A and the UE B, if channel initial control time and the like are considered, there may exist possibility that the UE C is unable to perform communication. Hence, if a situation of not-matched channel synchronization is applied not only to the UE A to the UE D but also to UEs communicating with the UEs, it may bring a complex sequence and may perform inefficient communication.

FIG. 14 shows a different case that channel sequences of UEs are not synchronized. In FIG. 13, it is assumed that the UE A, B and C perform legacy communication. Hence, the UE C should determine whether to follow legacy channel synchronization or channel synchronization of a new UE in a situation that synchronization is completed. In FIG. 14, a synchronization problem is explained when the three UEs intend to connect D2D communication in a situation that the UE A, B and C respectively perform D2D communication.

Since each UE operates with a channel sequence and channel synchronization of its own, each UE changes a channel sequence and matches channel synchronization to perform communication with a new UE. In case of a channel sequence, each UE can change a channel sequence to enable the UE to communicate with all connected UEs. In particular, in other word, although a UE determines a channel sequence of its own and the UE may hop on determined time using a determined channel, synchronization is a different matter. Since synchronization relates to determination on whether to make a channel synchronization of a specific UE to be a reference between UEs performing communication or whether to configure a whole new channel synchronization while a channel is generated, it is necessary to consider a channel synchronization of a counterpart UE. Since a clear reference or standard for channel synchronization between channel hopping UEs has not been selected yet for D2D communication, it is required to configure a clear reference.

In the following, in case of synchronizing UEs performing D2D communication, the present invention proposes a method of determining a channel synchronization reference UE. In order to perform channel synchronization, at least two UEs exist. Hence, it is necessary to satisfy both channel synchronization of a UE and channel synchronization of a counterpart UE. And, if a UE maintains a different communication session, since there may exist a following derivative synchronization process such as 1-hop, 2-hops and the like, it is hard to consider it as a problem between two UEs only.

Channel Synchronization Reference UE

In the following, when two UEs operate with a channel synchronization of its own, the present invention proposes a method of determining one of the two UEs as a channel synchronization reference UE.

Figure 15:
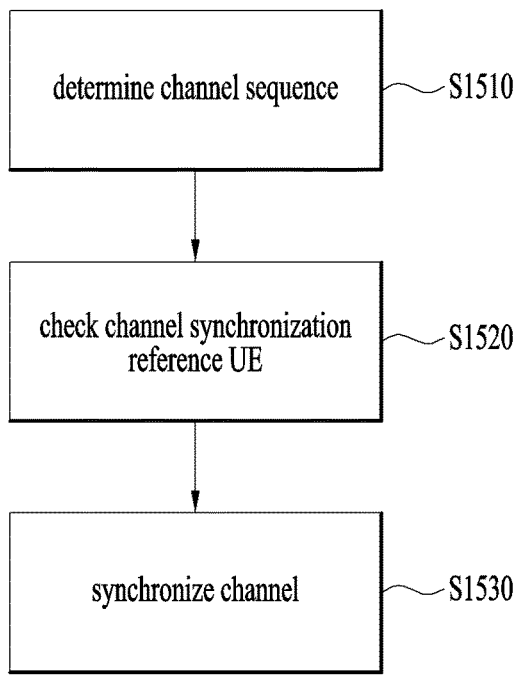
FIG. 15 is a flowchart for a channel synchronization process according to one embodiment of the present invention.

FIG. 15 is a flowchart for a channel synchronization process according to one embodiment of the present invention.

Two UEs performing D2D (device-to-device) communication may respectively have a channel sequence of its own. The two UEs may operate in a manner of hopping a plurality of channels or may communicate with each other on a single channel. Since a new communication session is established between the UEs, it is very difficult to satisfy all legacy channel sequences of the two UEs. Hence, it is necessary to determine a channel sequence satisfying both a previously connected UE and a newly connected UE. If the channel sequence is determined, the UEs can operate with the changed channel sequence [S1510].

Having determined the channel sequence, the UEs can negotiate with each other to determine a reference UE of channel synchronization [S1520]. If a channel synchronization reference UE is determined via a series of processes, channel synchronization can be performed in accordance with channel synchronization of the reference UE [S1530].

Figure 16:
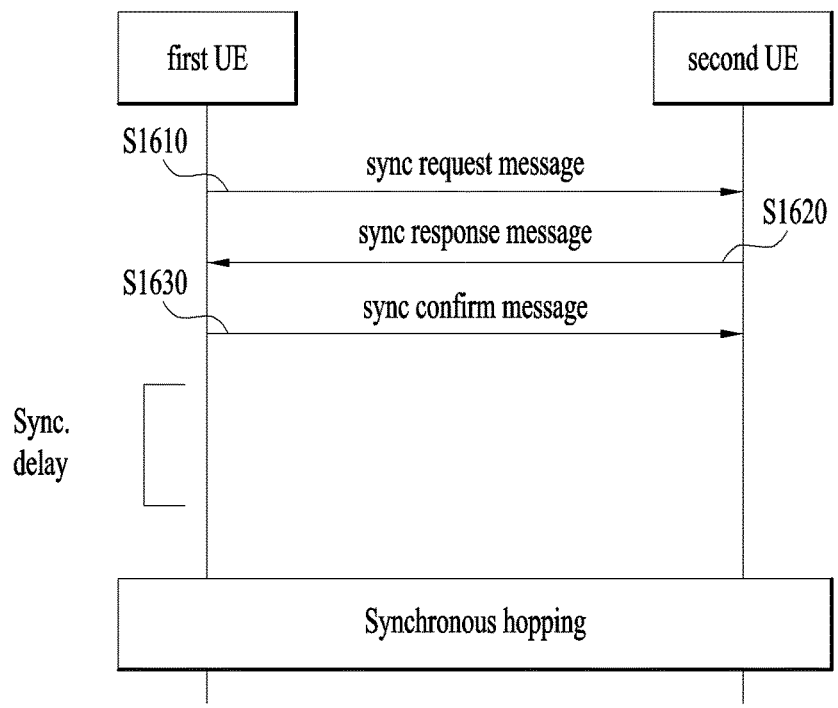
FIG. 16 is a flowchart for a channel synchronization process according to one embodiment of the present invention.

FIG. 16 is a flowchart for a channel synchronization process according to one embodiment of the present invention.

As shown in FIG. 16, a reference UE of channel synchronization can be determined in a manner of exchanging a message with each other between two UEs. First of all, a first UE operating with a first channel sequence transmits a sync request message to a second UE operating with a second channel sequence [S1610]. In a new D2D communication, although it is preferable for a UE firstly discovered a counterpart UE to transmit the sync request message, it is also possible to transmit the sync request message by a different reference. For instance, although the first UE firstly discovered the second UE, if the first UE asks the second UE to perform D2D communication, the second UE accepts the request and may be able to transmit the sync request message to the first UE as a response for the acceptance.

The sync request message can include channel sequence information of the first UE. And, the sync request message can further include channel synchronization information of the first UE. This is because, if channel sequence determination and synchronization are completed before communication is performed between the two UEs, it may be able to efficiently perform resource management in the communication. As mentioned in the foregoing description, the first UE can transmit the channel sequence information (e.g., ch.1→ch.3→ch.2→ch.4) of the first UE to the second UE. Having received the channel sequence information of the first UE, the second UE can determine a time section and a channel for communicating with the first UE.

Having received the sync request message from the first UE, the second UE can determine a channel synchronization reference UE using a prescribed algorithm to synchronize with the first UE. If the channel synchronization UE is determined using the prescribed algorithm, the second UE can transmit a sync response message including information on the determined channel synchronization reference UE to the first UE [S1620]. In this case, the sync response message can include channel sequence information (a channel sequence of the second UE can also be changed using a method similar to the method of changing the channel sequence of the first UE) of the second UE, channel synchronization information of the second UE and information on a UE corresponding to the channel synchronization reference UE. Having received the sync response message from the second UE, the first UE can obtain various informations via the sync response message. First of all, the first UE can change a channel sequence of the first UE based on the channel sequence information of the second UE. For instance, if the channel sequence of the first UE corresponds to 'ch.1→ch.3→ch.2→ch.4' and the channel sequence of the second UE corresponds to 'ch.3→ch.2→ch.3→ch.2', the first UE may operate with a third channel sequence in a manner of changing the channel sequence of the first UE to 'ch.1→ch.2→ch.1→ch.2'.

The first UE is able to know the channel synchronization reference UE between the two UEs via the sync response message of the second UE. The first and the second UE store the prescribed algorithm and may be able to determine a channel synchronization reference UE via the prescribed algorithm irrespective of whether the first UE or the second UE receives the sync request message.

Before the two UEs actually performs communication after the channel synchronization reference UE is checked with each other, the first UE can transmit a sync confirm message to the second UE to make sure the channel synchronization reference UE to the second UE [S1630]. The sync confirm message can be transmitted to the second UE after the reference UE is determined. This is aimed for, although the second UE is determined as the channel synchronization reference UE using the prescribed algorithm, enabling the second UE to reject the determination of becoming the channel synchronization reference UE in consideration of channel environment of the second UE. If the first UE is determined as the channel synchronization reference UE, the second UE is unable to change the determination. This is because the second UE is unable to completely know a channel status of the first UE. When the second UE is determined as the channel synchronization reference UE, if the second UE does not have hardware/software capability sufficient enough for performing the channel synchronization reference UE, the second UE can transmit a message to the first UE to ask the first UE to become the reference UE. Hence, information on a final channel synchronization reference UE and information on time on which synchronization to be performed can be transmitted via the sync confirm message. By doing so, synchronization between the two UEs can be performed. Having exchanged the sync confirm message, the two UEs may have prescribed sync delay time. The two UEs are synchronized after the prescribed sync delay time elapse and may be able to operate based on a changed channel sequence.

Channel Synchronization Reference UE Determination Algorithm

In the following, an algorithm for determining the aforementioned channel synchronization reference UE is explained.

As a preferable method, it may be able to consider a method of determining a receiving side UE configured to receive a sync request message as a channel synchronization reference UE. This is because, in case of performing new D2D communication, if a UE requesting communication follows synchronization of the UE configured to receive the sync request message, it does not affect channel synchronization of the UE configured to receive the sync request message. In this case, the UE configured to receive the sync request message may not have a big burden for an operation of channel synchronization. This is because the UE configured to receive the sync request message considers a channel sequence only to perform communication with a newly connected UE.

When the UE configured to receive the sync request message becomes the channel synchronization reference UE, if channel synchronization is simply performed between two UEs, there is no big difficulty. Yet, in case of a UE communicating with not only a new UE but also a legacy UE, if a channel synchronization is changed, it may cause a derivative problem in 1-hop UE and 2-hop UE. For instance, when a UE A and a UE B perform legacy communication, if the UE A transmits a sync request message to a UE C to perform new D2D communication with the UE C, the UE C, which is a receiving side UE, becomes a channel synchronization reference UE when an algorithm is used. If the UE A matches channel synchronization of the UE A with channel synchronization of the UE C, a problem occurs on channel synchronization of the 1-hop UE B, which used to perform communication with the UE A. Although the channel synchronization of the UE B is matched with the channel synchronization of the UE A, 2-hops UE of the UE A corresponding to a 1-hop UE of the UE B should perform synchronization again. In particular, a series of operations are required. Hence, it may be preferable to basically determine the receiving side UE configured to receive a sync request message as a channel synchronization reference UE. If it is determined as the aforementioned decision is not appropriate for communication environment, it may be preferable to apply a different reference.

Among two UEs intending to perform new D2D communication, a UE including the greater number of established sessions can be determined as a channel synchronization reference UE. This is because, in case of performing a series of synchronization jobs after synchronization is achieved, performing a less amount of synchronization is more efficient. For instance, when the UE A performs two D2D communications including D2D communication between the UE A and the UE B and D2D communication between the UE A and the UE C, if a UE D, which is a counterpart UE of new D2D communication, has legacy communication equal to or less than 1, it is preferable to determine the UE A as a channel synchronization reference UE to enable the UE D to follow channel synchronization of the UE A. On the contrary, if the UE D performs three D2D communications including D2D communication between the UE D and a UE E, D2D communication between the UE D and a UE F and D2D communication between the UE D and a UE G, it is preferable to determine the UE D as a channel synchronization reference UE to enable the UE A to follow channel synchronization of the UE D.

It is necessary to have a reference when the number of communication sessions connected to a UE is determined. First of all, the number of communication sessions connected to a UE can be restricted to the number of D2D communication. A UE can perform communication of various types as well as D2D communication at the same time. If communication performed by a UE is restricted to the D2D communication, it is able to precisely determine the number of sessions connected to the UE.

In determining the number of connected sessions, a UE may be restricted to UEs within the number of prescribed hops from a UE. Since a UE performing D2D communication is able to perform communication with a further different UE, if channel synchronization changes, processes for changing channel synchronization can be performed in succession. Hence, if such a prescribed number as 1-hop or 2-hops becomes a reference, the prescribed number can be a reference for determining the number of sessions connected to a UE.

Among UEs including information on channel synchronization, a UE including older channel synchronization may become a channel synchronization reference UE. Since a UE is able to perform communication with a plurality of UEs, it is able to know that there is a UE including identical channel synchronization from a UE including older channel synchronization among two UEs. Hence, it is able to determine a channel synchronization reference UE based on timing of generating channel synchronization information.

Moreover, a channel synchronization reference UE can be determined based on the number of hops from a UE including information on oldest channel synchronization. In this case, it is preferable to determine a UE including the less number of hops as the channel synchronization reference UE. If a UE has the less number of hops from the UE including the information on the oldest channel synchronization, it can be comprehended as that the UE also includes old channel synchronization and it is highly probable that the UE becomes a UE including identical synchronization.

The aforementioned several references have a common point. The common point is to plan stability of synchronization of all UEs by minimizing derivative series of synchronization. Hence, besides the aforementioned references, it is preferable to determine a channel synchronization reference UE to stabilize synchronization of all UEs.

Figure 17:
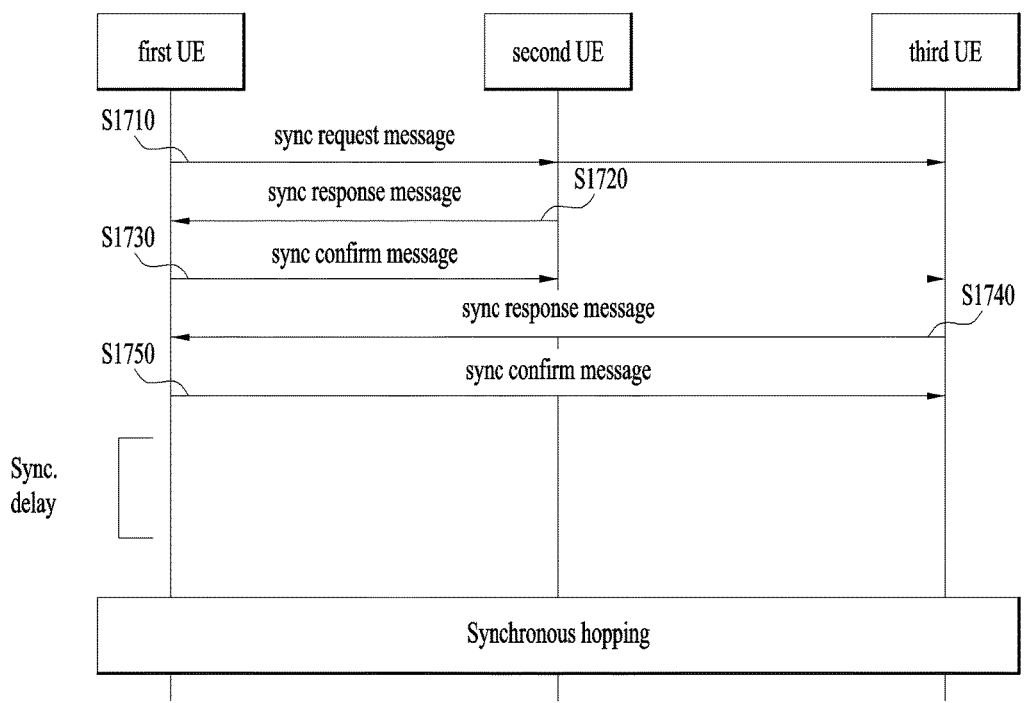
FIG. 17 is a flowchart for a different channel synchronization process according to one embodiment of the present invention.

FIG. 17 is a flowchart for a different channel synchronization process according to one embodiment of the present invention.

As shown in FIG. 17, a sync request message is transmitted to a first UE, a second UE and a third UE at the same time. Matching channel synchronization with a plurality of UEs requires more complex procedures compared to synchronization between two UEs. First of all, the first UE intending to perform D2D communication with the second UE and the third UE can transmit the sync request message to the second UE and the third UE, respectively [S1710]. In this case, the sync request message can include channel sequence information of the first UE and channel synchronization information of the first UE. Having received the sync request message from the first UE, the second UE can transmit a sync response message to the first UE. In this case, the second UE determines a channel synchronization reference UE using an algorithm including the aforementioned prescribed reference and may be able to transmit the sync response message in which information on the channel synchronization reference UE is included to the first UE [S1720]. For instance, having received the sync request message, the second UE, which is a receiving side UE, determines itself as a channel synchronization reference UE of D2D communication and may be able to transmit the sync response message in which information on the second UE is included to the first UE. In this case, the sync response message can include channel sequence information of the second UE and channel synchronization information of the second UE. The first UE is able to know whether the second UE corresponds to the channel synchronization reference UE by receiving the sync response message from the second UE (if the second UE rejects to be the channel synchronization reference UE, the first UE is able to know that the first UE becomes the channel synchronization reference UE). Hence, the first UE can transmit a sync confirm message indicating that the second UE corresponds to the channel synchronization reference UE and synchronization is to be performed on prescribed time to the second UE [S1730]. Since these procedures correspond to synchronization between two UEs, the procedures are identical to what is mentioned earlier.

In a situation that the second UE is determined as the channel synchronization reference UE, the first UE can receive a sync response message from the third UE [S1740]. The sync response message transmitted from the third UE can include information on a channel synchronization reference UE between the first UE and the third UE and can further include channel sequence information and channel synchronization information of the third UE. Similar to the aforementioned example, having received the sync request message, the third UE, which is a receiving side UE, can be determined as a channel synchronization reference UE. In this case, if the first UE follows a channel synchronization of the third UE, it may make the aforementioned synchronization procedure meaningless. Hence, the first UE can transmit a sync confirm message to the third UE to indicate that the first UE follows a channel synchronization of the second UE [S1750]. Having received the sync confirm message from the first UE, the third UE can follow the channel synchronization of the first UE. By doing so, channel synchronization between the first UE, the second UE and the third UE can be performed.

Yet, the first UE may not transmit information indicating that the first UE follows the channel synchronization of the second UE to the third UE. Since the first UE becomes aware of the channel sequence information and the channel synchronization information of the second UE and the third UE, the first UE can determine whether the third UE is more efficient as a channel synchronization reference UE in channel environment of D2D communication based on the channel sequence information and the channel synchronization information of the second UE and the third UE. If the third UE is determined as a more efficient channel synchronization reference UE, it may follow the channel synchronization of the third UE. In this case, the first UE additionally transmits a sync confirm message to the second UE to indicate that the first UE follows the channel synchronization of the third UE. By doing so, channel synchronization can be performed.

Figure 18:
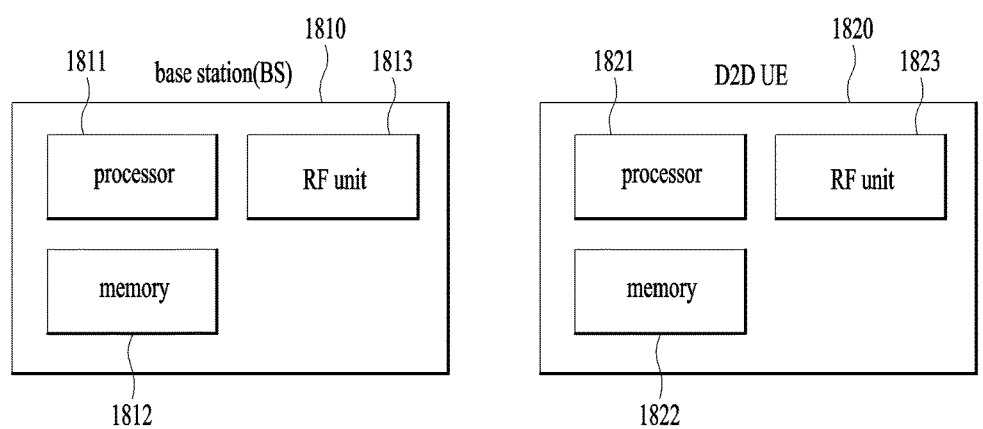
FIG. 18 is a block diagram for a wireless communication device according to one embodiment of the present invention.

FIG. 18 is a block diagram for a wireless communication device according to one embodiment of the present invention.

Referring to FIG. 18, a wireless communication system includes a base station 1810 and a plurality of D2D UEs 1820 located at the inside of a region of the base station 1810. In this case, a D2D UE may correspond to the aforementioned source UE or a target UE.

The base station 1810 includes a processor 1811, a memory 1812 and an RF (radio frequency) unit 1813 (or a transceiver). The processor 1811 can be configured to implement the proposed functions, processes and/or methods. Layers of a wireless interface protocol can be implemented by the processor 1811. The memory 1812 is connected with the processor 1811 and then stores various kinds of information associated with an operation of the processor 1811. The RF unit 1813 is connected with the processor 1811 and transmits and/or receives a radio signal.

The D2D UE 1820 includes a processor 1821, a memory 1822 and an RF unit 1823 (or a transceiver). The processor 1821 can be configured to implement the proposed functions, processes and/or methods. Layers of a wireless interface protocol can be implemented by the processor 1821. The memory 1822 is connected with the processor 1821 and then stores various kinds of information associated with an operation of the processor 1821. The RF unit 1823 is connected with the processor 1821 and transmits and/or receives a radio signal.

The memory 1812/1822 can be installed in the inside or the outside of the processor 1811/1822 and can be connected with the processor 1811/1822 using a medium well-known to public. The base station 1810 and/or the D2D UE 1820 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of efficiently transmitting feedback in a multi-antenna wireless communication system and an apparatus therefor are described with reference to examples applied to 3GPP LTE system, it may be applicable to various kinds of wireless communication systems as well as the 3GPP LTE system.

What is claimed is:

1. A method of performing D2D (device-to-device) communication in a wireless communication system, the method comprising:
transmitting a sync request message by a first user equipment (UE) operating with a first channel sequence to a second UE operating with a second channel sequence;
receiving a sync response message containing information on the second channel sequence of the second UE from the second UE in response to the sync request message; and
determining a third channel sequence determined by the first UE based on information on the first channel sequence and the received information on the second channel sequence,
wherein the sync response message comprises channel synchronization reference UE information becoming a reference of channel synchronization between the first UE and the second UE.

2. The method of claim 1, further comprising:
transmitting a sync confirm message by the first UE containing information on the determined third channel sequence transmitted to the second UE.

3. The method of claim 1, further comprising:
performing channel synchronization by the first UE with the second UE based on the channel synchronization reference UE information.

4. The method of claim 1, further comprising:
transmitting the information on the determined third channel sequence transmitted by the first UE to at least one other UE in a plurality of UEs of which a session is connected with the first UE.

5. The method of claim 1, wherein the channel synchronization reference UE information corresponds to the second UE receiving the sync request message in D2D communication performed between the first UE and the second UE.

6. The method of claim 1, wherein the channel synchronization reference UE information corresponds to a receiving side UE receiving data in D2D communication performed between the first UE and the second UE.

7. The method of claim 1, wherein the channel synchronization reference UE information corresponds to a UE containing an older channel sequence among the first UE and the second UE.

8. The method of claim 1, wherein the channel synchronization reference UE information is determined by a UE maintaining a greater number of communication session connections between the first UE and the second UE.

9. The method of claim 8, wherein the communication session connections correspond to D2D (device-to-device) communication session connections.

10. The method of claim 8, wherein the communication session connections correspond to session connections communicating with a UE within 2-hops.

11. The method of claim 1, wherein the third channel sequence corresponds to a sequence identical to one of the first channel sequence and the second channel sequence.

12. A method of performing D2D (device-to-device) communication in a wireless communication system, the method comprising:
receiving a sync request message by a second user equipment (UE) operating with a second channel sequence from a first UE operating with a first channel sequence;

transmitting a sync response message by the second UE containing information on the second channel sequence of the second UE to the first UE in response to the sync request message; and determining a third channel sequence by the second UE based on information on the received first channel sequence and the information on the second channel sequence, wherein the sync response message comprises channel synchronization reference UE information becoming a reference of channel synchronization between the first UE and the second UE.

13. A method of performing D2D (device-to-device) communication in a wireless communication system, the method comprising:

transmitting information on a first channel sequence by a first user equipment (UE) operating with the first channel sequence to a second UE operating with a second channel sequence;

receiving information on the second channel sequence of the second UE from the second UE in response to the information on the first channel sequence;

determining a third channel sequence determined by the first UE based on the information on the first channel sequence and the received information on the second channel sequence; and operating the first UE with the determined third channel sequence, wherein information on the determined third channel sequence comprises hopping sequence information of the first UE for a channel of D2D communication which is performed with a plurality of UEs of which a session is connected with the first UE.

14. A first user equipment (UE) performing D2D (device-to-device) communication in a wireless communication system, comprising:

a transceiver; and a processor, wherein the processor configured to:

control the first UE operating with a first channel sequence to transmit a sync request message to a second UE operating with a second channel sequence, receive a sync response message from the second UE containing information on the second channel sequence of the second UE in response to the sync request message, determine a third channel sequence based on information on the first channel sequence and the received information on the second channel sequence, wherein the sync response message comprises channel synchronization reference UE information becoming a reference of channel synchronization between the first UE and the second UE.

* * * * *